(12) United States Patent
Summers

(10) Patent No.: US 6,429,368 B1
(45) Date of Patent: Aug. 6, 2002

(54) SHORTENED SOLAR CELL ARRAY

(75) Inventor: Darrell L. Summers, Huntington Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/812,981

(22) Filed: Mar. 20, 2001

(51) Int. Cl.[7] ............................................. H01L 31/045
(52) U.S. Cl. ....................... 136/245; 136/244; 136/292; 244/173
(58) Field of Search ................................ 136/244, 245, 136/292; 244/173

(56) References Cited

U.S. PATENT DOCUMENTS

| | | | | |
|---|---|---|---|---|
| 4,371,134 A | * | 2/1983 | Marello et al. | 244/173 |
| 4,426,052 A | * | 1/1984 | Hubert et al. | 136/292 |
| 4,725,023 A | * | 2/1988 | Shiki | 244/173 |
| 4,988,060 A | * | 1/1991 | Janson et al. | 244/173 |
| 6,008,448 A | * | 12/1999 | Peck | 136/245 |
| 6,284,966 B1 | * | 9/2001 | Simburger et al. | 136/244 |
| 6,284,967 B1 | * | 9/2001 | Hakan et al. | 136/245 |

* cited by examiner

*Primary Examiner*—Alan Diamond

(57) ABSTRACT

A foldable solar cell array (10') with multiple hinged panels, each with a segment of solar cells on a first face of each panel. Maximum power demands are met by employing a shortened outermost panel (20') to minimize mass and inertia of the array. In a folded configuration, power generated from solar cells on the shortened outermost panel (20') are supplemented by power generated from an additional segment of solar cells on a second face of the panel adjacent to the outermost one.

2 Claims, 2 Drawing Sheets

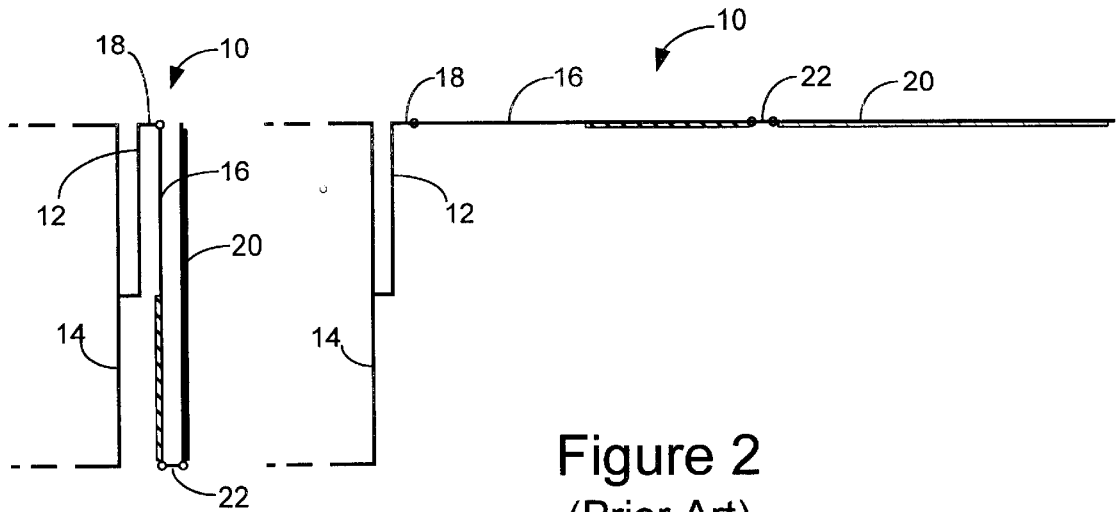
Figure 1
(Prior Art)
Figure 2
(Prior Art)
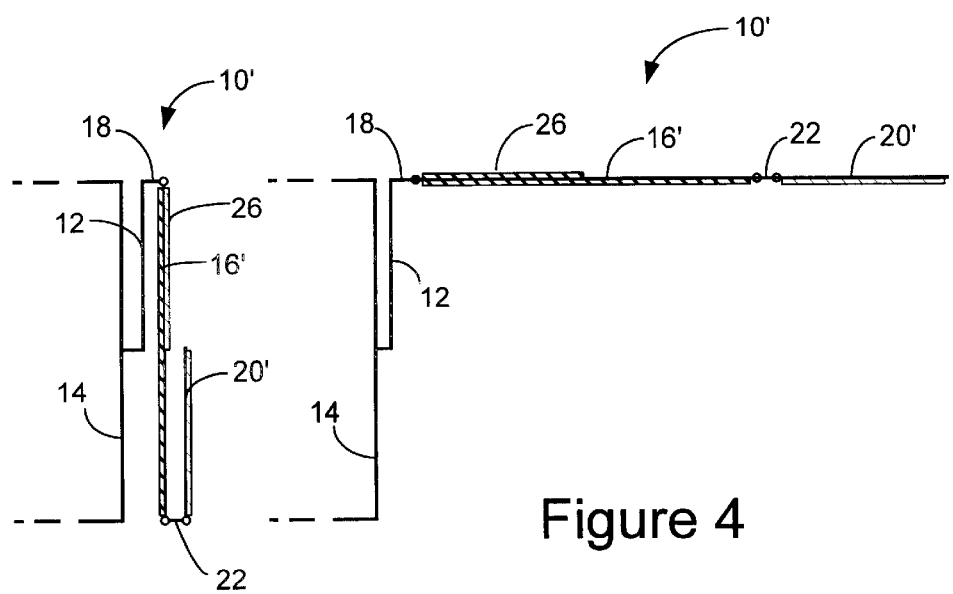
Figure 3
Figure 4

SHORTENED SOLAR CELL ARRAY

STATEMENT REGARDING FEDERALLY SPONSORED RESEARCH OR DEVELOPMENT

The U.S. Government has certain rights in this invention pursuant to the clause at FAR 52.227-12.

BACKGROUND OF THE INVENTION

This invention relates generally to arrays of solar cells and, more particularly, to solar cell arrays used on spacecraft. It is, of course, well known that arrays of photo-voltaic cells, referred to as solar cells, provide the principal source of electrical power for spacecraft. Although solar cells have improved in efficiency of power conversion, arrays presenting a very large area are still required to fulfill the power requirements of a typical space vehicle. For most spacecraft missions, solar cell arrays of large area are not fully deployed until an operational orbit has been reached.

Typically, an unmanned spacecraft is first launched into a relatively low earth orbit, and then traverses a transfer orbit to attain its final operational orbit, such as a medium earth orbit or a geosynchronous orbit. Solar panels are stowed for launch in a folded configuration, usually with multiple flat panels hinged together and folded in accordion style. Although some of the panels are needed to provide power during the transfer orbit, they must usually be kept folded to minimize spacecraft inertia. If the panels were to be fully deployed in the transfer orbit, the increase in inertia would make control of the spacecraft more difficult. In the transfer orbit, power demands are lower than in operational orbit because one or more payload modules will not be activated until the operational orbit is attained. In the folded configuration, only one panel, the outermost panel, will normally be exposed to the sun, and the power system is designed such that this one panel has sufficient area to supply the needs of the vehicle while in the transfer orbit. When the panels are fully deployed to form a large array of N flat panel segments, the power generation capability of the array is increased by a factor of N.

If the total power requirements of the spacecraft in operational orbit closely match the power generated by the N fully deployed panels, this arrangement is satisfactory. If, however, the power requirements can be met by something less that an integral number of panels, a significant inefficiency arises. For example, if only two and a half full panels are needed to meet the maximum power requirements, and one full panel is needed for the transfer orbit configuration, then the array will still normally be constructed as three full panels. This is because the solar cells on the outermost panel are fully utilized to meet the transfer orbit power requirements. The innermost panel, in this example, may be made with only half its area covered with active cells, making a total of two and a half panels in the deployed configuration. This three-panel configuration has an unnecessarily high inertia because three full panels are used when less than three are needed.

Ideally, it would be highly desirable to provide a foldable solar array that contained only as many cells, in panels and part panels, as were necessary to meet maximum power requirements, but which would still meet the power requirements of the transfer orbit while in a folded configuration. The present invention meets this goal.

BRIEF SUMMARY OF THE INVENTION

The present invention resides in a shortened solar array having a number of panels hinged together for folding in accordion style, but in which an outermost panel is a partial panel, for better matching of the power generation capacity of the array to the maximum power requirements to be met by the array. The invention may be defined as a foldable solar cell array with minimal inertia, but which still provides sufficient cell area to meet power demands in both deployed and folded configurations. The solar cell foldable array comprises a plurality of panels, including an innermost panel for coupling to a spacecraft, and an outermost panel that is smaller in area than each of the other panels. Each panel has first and second parallel faces and each panel is hinged to the next in succession to permit the panels to be moved between a deployed configuration in which the panels are generally coplanar, and a folded configuration in which the panels are stacked together in a generally parallel relationship. The structure of the invention further includes a segmented array of solar cells, with each segment being mounted on the first face of each of the panels, such that the segments together form a practically continuous array in the deployed configuration, and provide sufficient power to meet the maximum demands of the spacecraft. Critical to the invention is an additional segment of solar cells, mounted on the second face of the panel next to the outermost panel. The additional segment, in the folded configuration, forms a sub-array of solar cells with the segment of cells mounted on the first face of the smaller outermost cell, and this sub-array of cells provides sufficient power in the folded configuration to meet spacecraft power demands in a transfer orbit.

More specifically, the outermost panel has an area p.A, where A is the area of each of the other panels and p is a factor less than unity. The additional segment of cells covers an area (1-p).A of the next-to-outermost panel. The outermost panel and the additional segment of cells together provide a cell area A in the folded configuration.

In one illustrative embodiment of the invention, the number of panels in the foldable array is two. The innermost panel and the panel next to the outermost panel are one and the same in this embodiment.

The invention may also be defined in accordance with the illustrative embodiment, as a foldable solar cell array comprising an inner panel having first and second parallel faces and first and second parallel edges, wherein the first edge is pivotally attachable to a fixed yoke on a spacecraft; and an outer panel having one edge pivotally attached to the second edge of the inner panel. The solar cell array is movable between a folded configuration in which the inner and outer panels are substantially parallel with each other and a deployed configuration in which the inner and outer panels are substantially coplanar. The structure further includes a segmented array of solar cells, including a first segment installed over the entire first face of the inner panel and a second segment installed over one entire face of the outer panel. The first and second segments form a practically continuous array in the deployed configuration, and provide sufficient power to meet the demands of the spacecraft in an operational orbit. The outer panel is smaller in area than the inner panel, to minimize total mass and inertia. The structure further comprises an additional segment of solar cells installed on the second face of the inner panel. The additional segment of solar cells on the inner panel and the second segment of cells on the outer panel together form a practically continuous sub-array in the folded configuration, and this sub-array of solar cells provides sufficient power to meet spacecraft requirements in a transfer orbit, without deploying the array.

It will be appreciated from the foregoing that the present invention represents a significant advance in the field of foldable solar arrays. In particular, the invention provides a technique for shortening the outer panel of an array without sacrificing power generation capability when the array is in its folded configuration. Other aspects and advantages of the invention will become apparent from the following more detailed description, taken in conjunction with the accompanying drawings.

BRIEF DESCRIPTION OF THE SEVERAL VIEWS OF THE DRAWINGS

FIG. 1 is a diagrammatic view depicting a conventional solar cell array having two panels, shown in a folded configuration.

FIG. 2 is a view similar to FIG. 1, but showing the array in a fully deployed configuration.

FIG. 3 is diagrammatic view of a solar cell array in accordance with the present invention, shown in a folded configuration.

FIG. 4 is a view similar to FIG. 3, but showing the array in a fully deployed configuration.

DETAILED DESCRIPTION OF THE INVENTION

Figure 5:
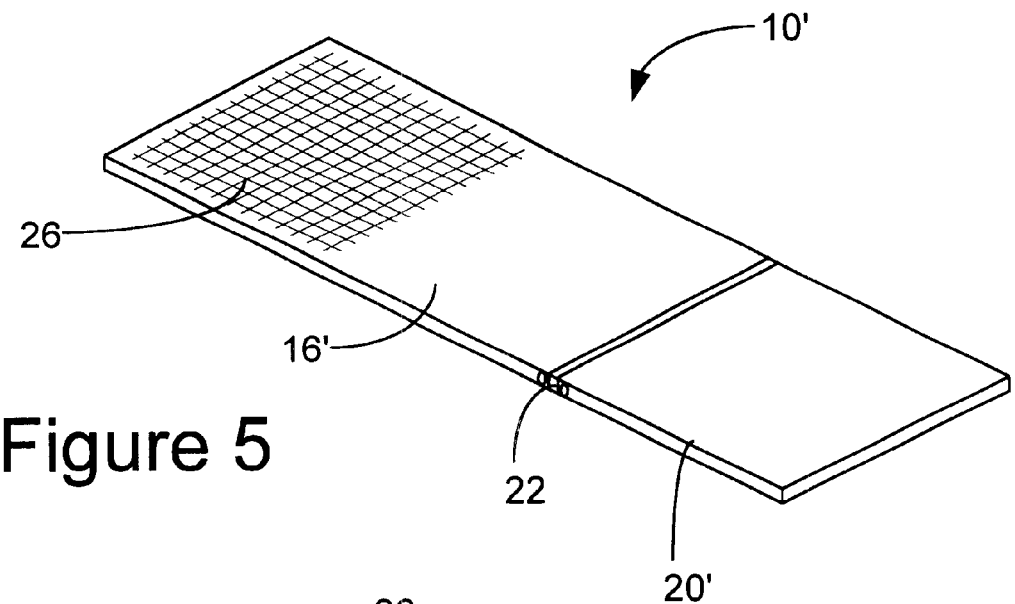
FIG. 5 is a simplified perspective view of the deployed array shown in FIG. 4.

As shown in the drawings for purposes of illustration, the present invention pertains to solar cell arrays used to provide electrical power on space vehicles, such as earth-orbiting satellites. FIG. 1 depicts a solar cell array, indicated generally by reference numeral 10, attached by a yoke 12 to a spacecraft, a portion of which is indicated at 14. Solar cell arrays are typically constructed to include multiple flat panels, the edges of which are coupled by hinges to allow folding the panels in accordion style. For purposes of illustration, the array 10 is shown as including two panels: an inner panel 16 connected by a hinge mechanism 18 to the yoke 12, and an outer panel 20 connected to the inner panel 16 by another hinge mechanism 22.

When the array 10 is in a folded configuration, as shown in FIG. 1, the inner and outer panels 16 and 20 are parallel to each other and form a compact structure that minimizes volume, for stowage in a launch vehicle (not shown), and also minimizes inertia, to facilitate control of the spacecraft in a transfer orbit. In a fully deployed configuration, as shown in FIG. 2, the inner and outer panels 16 and 20 are extended in a coplanar fashion. To reach this configuration, the inner panel 16 is rotated 90° about the hinge mechanism 18, in a counterclockwise direction as illustrated in FIG. 1, and the outer panel 20 is rotated 180° about the hinge mechanism 22, in a clockwise direction. The specific mechanism used to effect these movements is not shown and is not critical to the invention.

In the array shown, a solar cell area equivalent to one and a half panels is required to meet the maximum power demands of the spacecraft when it reaches its operational orbit. In a conventional array, this required area of solar cells is provided by installing the cells on one face of the outer panel 20 and half of one face of the inner panel 16. The cross-hatched regions on each panel illustrate the positions of the solar cells on the respective panels 16 and 20. The "active" faces of the panels 16 and 20 on which the solar cells are installed are on the same face of the fully deployed array 10, as shown in FIG. 2. In the operational orbit of the spacecraft, the array is oriented to point the active face of the array toward the sun. When the array 10 is still in the folded configuration, the outer panel 20 presents its active face in an outward direction, which may be oriented to face the sun. Thus the array 10 provides power from one full panel area in this configuration. In a transfer orbit, with the panel folded to minimize inertia, the array 10 presents two-thirds of its available area to the sun. The power generated in this folded configuration is known by design to be sufficient to satisfy the power demands of the spacecraft in the transfer orbit. Conventional design of folded arrays of this general type has always dictated that the outer panel 20 should be a full panel, in order to present a full-panel area of solar cells when the array is in the folded configuration.

For the example shown, half the area of the inner panel 16 is not used to generate power but the mass of this unused portion of the panel is still carried into orbit. Moreover, the mass of the deployed array 10 extends further from the yoke 12 than necessary, because of the unused half-length of the inner panel 16. Therefore, the array 10 has a relatively large angular inertia. Theoretically, this difficulty might be overcome by redesigning the yoke 12 to attach to a half-panel instead of the full inner panel 16. As a practical matter, however, it is desirable to construct the solar array from standardized components.

Figure 6:
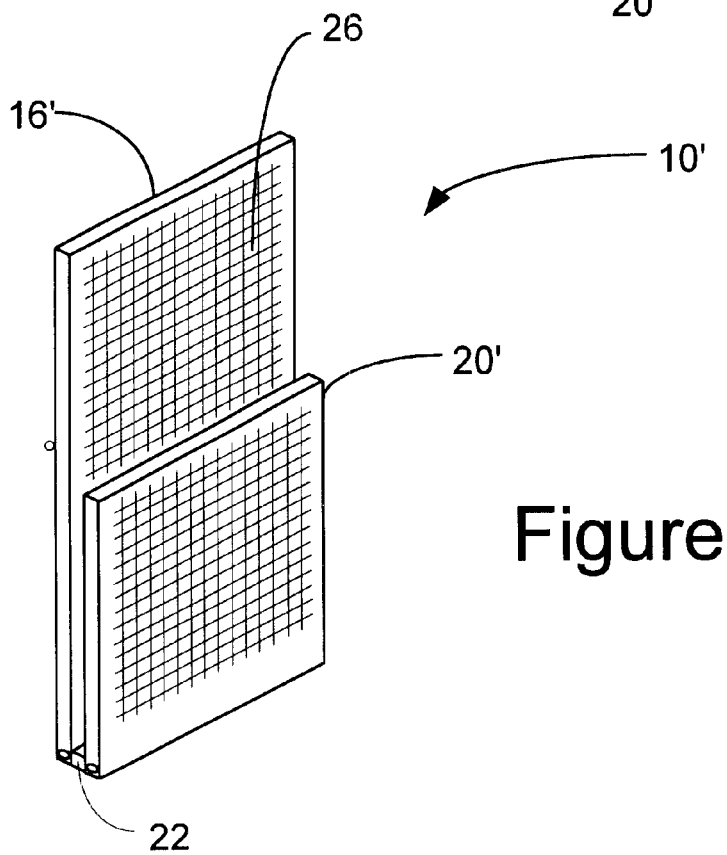
FIG. 6 is a simplified perspective view of the folded array shown in FIG. 3.

In accordance with the invention, and as shown in FIGS. 3–6, the deployed array 10' is reduced in overall length by one-half of a panel length, but the folded array still presents a total of one full panel of solar cells. More specifically, the array 10' of the present invention includes a full inner panel 16' and a half-size outer panel 20'. In the deployed configuration, as shown in FIGS. 4 and 5, the array 10' presents one full panel 16' and one half panel 20' having solar cells on the active face of the array. In the folded configuration, as shown in FIGS. 3 and 6, the array 10' makes use of a half-panel of solar cells, indicated at 26, installed on the "back" face of the inner panel 16'. In the folded configuration, this half-panel of cells 26 and the half-panel of cells on the active face of the outer panel 20' both face in the same direction, and together provide a full-panel area of cells for use in the transfer orbit.

In the example discussed above, the array 10' has only two panels and the maximum power demand is assumed to require one and a half panels. It will be understood, of course, that the invention is applicable more generally to other array configurations. If a particular spacecraft application has a maximum power demand equivalent to an integral number of solar panels, the invention is not needed. If, however, the maximum power demand can be satisfied by an integral number of panels together with a partial panel, then the invention may be used to reduce the mass and the inertia of the array. If the partial panel needed has an area of p.A, where A is the area of one panel and p is a value less than unity, then in accordance with the invention, the outermost panel should be made of area p.A and the next panel inward from the outermost panel should include solar cells on its back face, covering an area (1-p).A, to supplement the area p.A on the outermost panel. When the value of p is close to unity, the invention produces little saving in mass and inertia, but when p is significantly less than unity the invention provides a corresponding reduction in mass and inertia.

It will be appreciated from the foregoing that the present invention represents a significant advance in the field of solar cell arrays. In particular, the invention provides an array of sufficient but not excessive area to meet maximum power demands when the array is fully deployed, and utilizes solar cells on the back face of one of the array panels to provide power in the folded configuration. It will also be appreciated that various modifications may be made to the embodiments of the invention described, without departing from the spirit and scope of the invention. Accordingly, the invention should not be limited except as by the appended claims.

What is claimed is:

1. A foldable solar cell array that minimizes inertia by use of a shortened outer array panel, but which still provides sufficient cell area to meet power demands in deployed and folded configurations, the foldable solar cell array comprising:

a plurality of panels, including an innermost panel for coupling to a spacecraft, and an outermost panel that is smaller in area than each of the other panels, each panel having first and second parallel faces and each panel being hinged to the next in succession to permit the panels to be moved between a deployed configuration in which the panels are generally coplanar and a folded configuration in which the panels are stacked together in a generally parallel relationship;

a segmented array of solar cells, with each segment being mounted on the first face of each of the panels, wherein the segments together form a practically continuous array in the deployed configuration, to provide sufficient power to meet maximum demands of the spacecraft; and an additional segment of solar cells, mounted on the second face of the panel next to the outermost panel, wherein the additional segment, in the folded configuration, forms a sub-array of solar cells with the segment of cells mounted on the first face of the smaller outermost panel, and wherein the sub-array of cells provides sufficient power to meet spacecraft needs in the folded configuration;

and wherein:

the outermost panel has an area p.A, where A is the area of each of the other panels and p is a factor less than unity; and the additional segment of cells covers an area (1-p).A, whereby the outermost panel and additional segment of cells together provide a cell area A in the folded configuration.

2. A foldable solar cell array that minimizes inertia by use of a shortened outer array panel, but which still provides sufficient cell area to meet power demands in deployed and folded configurations, the foldable solar cell array comprising:

a plurality of panels, including an innermost panel for coupling to a spacecraft, and an outermost panel that is smaller in area than each of the other panels, each panel having first and second parallel faces and each panel being hinged to the next in succession to permit the panels to be moved between a deployed configuration in which the panels are generally coplanar and a folded configuration in which the panels are stacked together in a generally parallel relationship;

a segmented array of solar cells, with each segment being mounted on the first face of each of the panels, wherein the segments together form a practically continuous array in the deployed configuration, to provide sufficient power to meet maximum demands of the spacecraft; and an additional segment of solar cells, mounted on the second face of the panel next to the outermost panel, wherein the additional segment, in the folded configuration, forms a sub-array of solar cells with the segment of cells mounted on the first face of the smaller outermost panel, and wherein the sub-array of cells provides sufficient power to meet spacecraft needs in the folded configuration;

and wherein:

the number of panels in the foldable array is two; and the innermost panel and the panel next to the outermost panel are the same.

\* \* \* \* \*